UNITED STATES PATENT OFFICE.

ONO EARNSHAW, OF CHICAGO, ILLINOIS, ASSIGNOR OF ONE-HALF HIS RIGHT TO EDWARD JOHNSON, JR., OF SAME PLACE.

IMPROVEMENT IN FIRE LININGS AND BACKS FOR FURNACES, &c.

Specification forming part of Letters Patent No. 202,637, dated April 23, 1878; application filed January 12, 1878.

*To all whom it may concern:*

Be it known that I, ONO EARNSHAW, of Chicago, in Cook county, State of Illinois, have invented or discovered new and useful Improvement in Fire-Linings and Bricks for Furnaces, Converters, &c., of which the following is a full description:

The nature of my invention or discovery consists in forming a plastic material of crushed or pulverized sandstone, that may be molded or formed into any desired shape while in such plastic condition, and be burned or hardened in position so as to form a fire-lining, as hereinafter more fully described.

I take a sandstone found at Au Sable and Shemanville, in the counties of Grundy and Will, Illinois, and at other places where the same formation extends, and crush or pulverize it, so that it can be readily mixed. When crushed for fire-brick or other forms to be hardened before being put in position, it may be reduced as fine as ordinary sand, or it may be left somewhat coarser. When to be used in its plastic or unburned condition for furnace-linings, lining steel converters, and for other irregular shapes, the pulverized or finer form is preferable. When the stone is suitably pulverized I mix it with water to a consistency that will make it plastic but sufficiently compact to remain in the position in which it is placed when it is ready for use. I place it, in its raw or unburned condition, into the desired place, where, as in the case of furnaces, steel-converters, and other similar places where great heat is to be applied, it is left to be hardened or burned in use. In this condition it is also found useful for mending or patching old linings of fire-brick, as it adheres firmly and does not shrink in burning.

When used for regular forms, as for stove or grate linings, it may be molded and burned before being put into use. I have found that in use clinkers do not form on or adhere to it, as in the case of ordinary fire-brick.

The stone, upon analysis, is found to be composed substantially as follows: Silica, eighty-three parts; alumina, ten parts; mica, four parts; iron, two parts; lime, one part, the proportions in different specimens varying somewhat, the foregoing being an average.

Fire-brick of various forms have heretofore been made by the use of pulverized or crushed sandstone and clay mixed and burned together; but my improvement, as distinguished from the older art, consists in forming the material entirely of sandstone, made plastic by the simple use of water, or sufficiently cohesive to be used or put in place in such a raw or unburned state, and burned in the using, or for regular forms bearing such material for transportation or better handling, the material described, in its new treatment and its valuable characteristics, forming a new article for the purposes named.

What I claim as new, and desire to secure by Letters Patent, is—

As a new article of manufacture for fire-linings, to be applied raw or molded into form, crushed or pulverized Au Sable or analogous sandstone, made plastic with water, substantially as and for the purposes specified.

ONO EARNSHAW.

Witnesses:
 O. W. BOND,
 H. F. BRUNS.